(12) United States Patent
Valentine et al.

(10) Patent No.: US 7,747,017 B2
(45) Date of Patent: Jun. 29, 2010

(54) METHOD AND APPARATUS FOR END-TO-END CLEAR TRANSPORT PROTOCOL

(75) Inventors: Matthew F. Valentine, Chapel Hill, NC (US); John D. Brophy, Arlington Heights, IL (US); Michael J. Kirk, Mount Prospect, IL (US); Harn-Jier Lin, Lisle, IL (US); Lee M. Proctor, Cary, IL (US); Christopher R. Schmidt, Pinole, CA (US)

(73) Assignee: Motorola, Inc., Schaumburg, IL (US)

( * ) Notice: Subject to any disclaimer, the term of this patent is extended or adjusted under 35 U.S.C. 154(b) by 1246 days.

(21) Appl. No.: 11/289,836

(22) Filed: Nov. 30, 2005

(65) Prior Publication Data

US 2006/0115088 A1 Jun. 1, 2006

Related U.S. Application Data

(60) Provisional application No. 60/632,325, filed on Dec. 1, 2004.

(51) Int. Cl.
*H04K 1/00* (2006.01)
(52) U.S. Cl. .................. 380/244; 370/310; 713/165; 380/270
(58) Field of Classification Search ............ 380/244, 380/270; 713/165
See application file for complete search history.

(56) References Cited

U.S. PATENT DOCUMENTS

| 5,936,948 A * | 8/1999 | Sicher .................. 370/314 |
| 6,112,084 A * | 8/2000 | Sicher et al. ............ 370/337 |
| 2001/0055292 A1* | 12/2001 | Chai et al. ............. 370/338 |
| 2003/0123411 A1 | 7/2003 | Kim |
| 2004/0203606 A1 | 10/2004 | Souissi et al. |

OTHER PUBLICATIONS http://www.3gpp2.org/public_html/specs/N.S0019-0_v1.0.pdf, "Intersystem Link Protocol", 3GPP2, Jan. 28, 2000.*

* cited by examiner

*Primary Examiner*—Christopher J Brown
(74) *Attorney, Agent, or Firm*—Steven A. May

(57) ABSTRACT

A communication system provides a clear channel link for transport of encrypted payload across a network of the communication system. When a source access network receives, via an air interface, a frame that is formatted pursuant to an air interface protocol and that comprises encrypted payload, the source access network demultiplexes the frame to separate the encrypted payload and assembles an Intersystem Link Protocol (ISLP) frame that comprises the encrypted payload. The source access network adds a link layer header to the ISLP frame that identifies one or more of frame type information and a sequence value associated with the frame and conveys the ISLP frame and added header across the network, for example, to a destination access network. Based on the added header, the source and destination access networks are able to perform clear channel synchronization.

17 Claims, 9 Drawing Sheets

110, 130:

102, 122:

METHOD AND APPARATUS FOR END-TO-END CLEAR TRANSPORT PROTOCOL

CROSS-REFERENCE TO RELATED APPLICATION

This application claims priority from application Ser. No. 60/632,325, filed Dec. 1, 2004, and entitled "METHOD AND APPARATUS FOR END-TO-END CLEAR TRANSPORT PROTOCOL," which is commonly owned and incorporated herein by reference in its entirety.

FIELD OF THE INVENTION

The present invention relates generally to wireless communication systems and, in particular, to encrypted communication sessions in a wireless communication system.

BACKGROUND OF THE INVENTION

Wireless communication systems are inherently insecure communication systems due to the fact that anyone may intercept a wireless signal. As a result, encryption techniques have been developed that prevent unauthorized users from intercepting and correctly decoding private conversations. However, typically encryption is agreed upon at the setting up of a call and merely involves an encryption of the over-the-air portions of the communication. When encrypted voice is received from a source mobile station by a wireless infrastructure, the encrypted voice is decrypted by an access network serving the source mobile station and conveyed over the infrastructure in an unencrypted format. The unencrypted voice is then again encrypted by a destination access network before being conveyed over-the-air to a destination mobile station.

For highly secure communications where two end terminals, such as two mobile stations or a mobile station and a landline telephone, may use a publicly-owned wireless infrastructure (as opposed to a privately-owned enterprise system) to engage in a non-public, high security call, conveyance of the call over the infrastructure in an unencrypted format may be unacceptable. In such communications, it may be desirable to have end-to-end encryption, where only the end terminals are able to decrypt the communications. In order to provide such end-to-end encryption, the encryption scheme used, and even the data format employed, should be transparent to the publicly-owned infrastructure. Further, situations may arise where it may be desirable for a conversation that is engaged in via a publicly-owned infrastructure and that begins in a non-encrypted mode to switchover to a secure, encrypted mode.

Therefore, a need exists for a method and apparatus for providing an end-to-end clear transport of encrypted payload, wherein the transporting of an encrypted payload over an intervening infrastructure is independent of the encryption format employed and the data format being used by the end terminals and that further provides the users of the mobile stations with an option to convert a non-encrypted call to an encrypted call during the course of the call.

Figure 1:
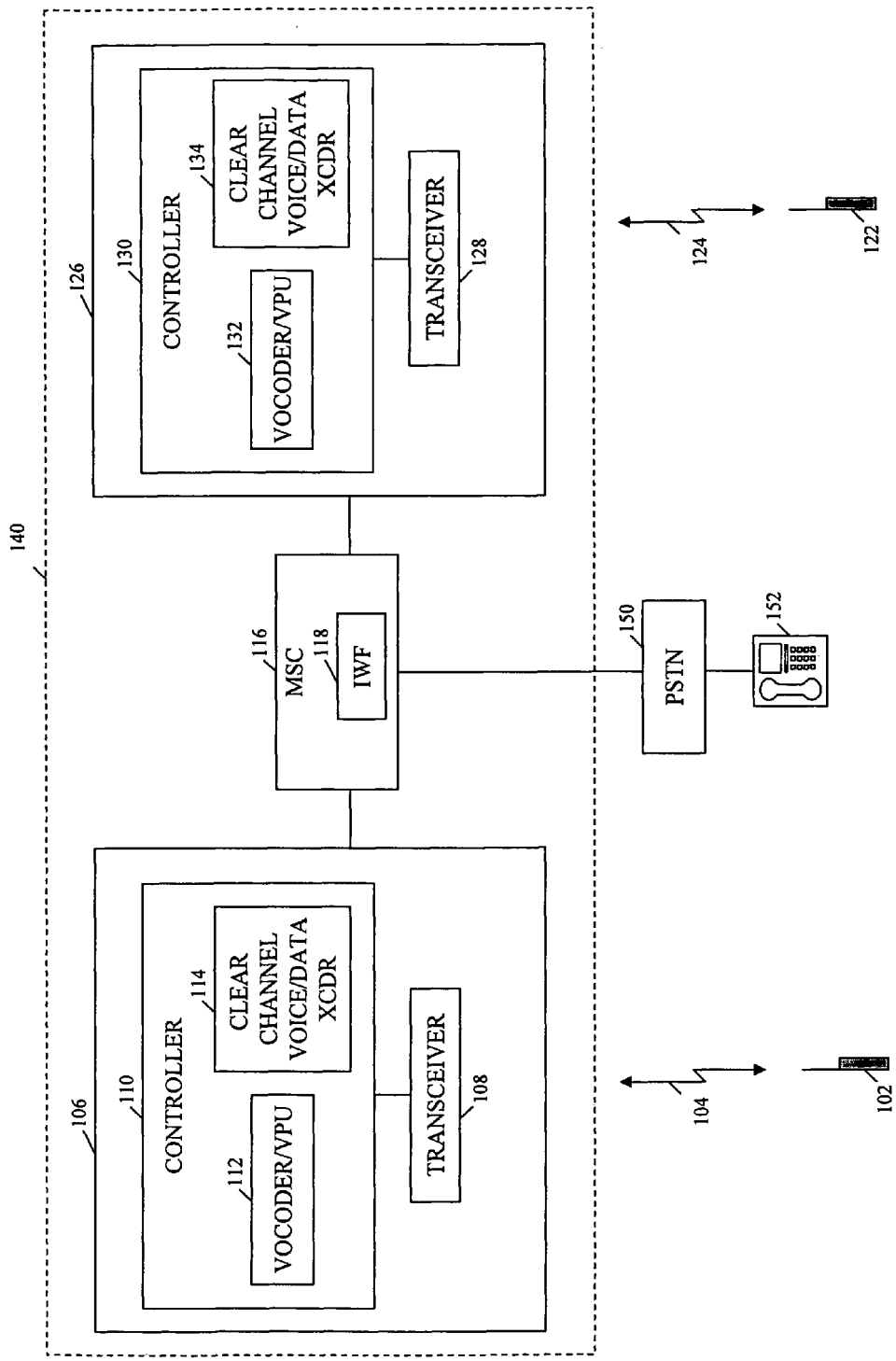
FIG. 1 is a block diagram of a wireless communication system in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and apparatus for providing an end-to-end clear transport of encrypted payload, wherein the transporting of an encrypted payload over an intervening infrastructure is independent of the encryption format employed and the data format being used by the end terminals and that further provides the users of the mobile stations with an option to convert a non-encrypted call to an encrypted call during the course of the call, a communication system is provided that provides a clear channel link for transport of encrypted payload across a network of the communication system. When a source access network receives, via an air interface, a frame that is formatted pursuant to an air interface protocol and that comprises encrypted payload, the source access network demultiplexes the frame to separate the encrypted payload and assembles an Intersystem Link Protocol (ISLP) frame that comprises the encrypted payload. The source access network adds a link layer header to the ISLP frame that identifies one or more of frame type information and a sequence value associated with the frame and conveys the ISLP frame and added header to across the network, for example, to a destination access network. In another embodiment of the present invention, instead of, or in addition to, adding a link layer header to the ISLP frame, the source access network may encode a particular number of bits in each ISLP frame to indicate the frame's coding rate and rate set. Padding may then be added to the frame to expand the number of bits to an even multiple of eight (8) bits. Based on the added header and/or a bit count associated with the ISLP frame, the source and destination access networks are able to perform clear channel synchronization.

Generally, an embodiment of the present invention encompasses a method for transport of encrypted payload across a network of a wireless communication system. The method includes receiving a frame via an air interface, wherein the frame is formatted pursuant to an air interface protocol and comprises encrypted payload, demultiplexing the frame to separate the encrypted payload, and assembling an ISLP frame that comprises the encrypted payload. The method further include adding a link layer header to the ISLP frame that identifies one or more of frame type information and a sequence value associated with the frame and conveying the ISLP frame and added header to a network element.

Another embodiment of the present invention encompasses a method for synchronizing access network controllers in a wireless communication system. The method includes monitoring a stream of frames received from an access network controller for ISLP frames, determining whether a 'ISLP_Sync_Lost_Count' value and a 'ISLP_Sync_Acquired_Count' value have changed, determining whether an invalid ISLP frame has arrived, and determining a number of valid ISLP frames that have arrived. The method further includes determining whether the access network controller is synchronized based on one or more of the 'Sync_Lost_Count' value, the 'Sync_Acquired_Count' value, whether an invalid ISLP frame has arrived, and a number of valid frames that have arrived.

Yet another embodiment of the present invention encompasses a wireless access network controller that is configured to receive a frame via an air interface, wherein the frame is formatted pursuant to an air interface protocol and comprises encrypted payload, demultiplex the frame to separate the encrypted payload, assemble an ISLP frame that comprises the encrypted payload, add a link layer header to the ISLP frame that identifies one or more of a coding rate of the frame, a sequence value associated with the frame, and whether the frame received via the air interface was correctly received, and convey the ISLP frame and added header to a network element.

Still another embodiment of the present invention encompasses a wireless access network controller that is configured to receive a frame via an air interface, wherein the frame is formatted pursuant to an air interface protocol and comprises encrypted payload, demultiplex the frame to separate the encrypted payload, assemble an ISLP frame that comprises the encrypted payload, encode a particular number of bits in the frame to indicate the frame's coding rate and rate set, and convey the ISLP frame and added header to a network element.

Yet another embodiment of the present invention encompasses a wireless access network controller that is configured to perform encryption synchronization by monitoring a stream of frames received from an access network controller for ISLP frames, determining whether a 'ISLP_Sync_Lost_Count' value and a 'ISLP_Sync_Acquired_Count' value have changed, determining whether an invalid ISLP frame has arrived, determining a number of valid ISLP frames that have arrived, and determining whether the access network controller is synchronized based on one or more of the 'Sync_Lost_Count' value, the 'Sync_Acquired_Count' value, whether an invalid ISLP frame has arrived, and a number of valid frames that have arrived.

Still another embodiment of the present invention encompasses a system that includes a first wireless access network controller that is configured to receive a frame via an air interface, wherein the frame is formatted pursuant to an over-the-air protocol and comprises encrypted payload, demultiplex the frame to separate the encrypted payload, assemble an ISLP frame that comprises the encrypted payload, add a link layer header to the ISLP frame that identifies one or more of a coding rate and rate set of the frame, a sequence value associated with the frame, and whether the frame received via the air interface was correctly received, and convey the ISLP frame and added header. The system further includes a second wireless access network controller that receives the ISLP frame and added header from the first wireless access network controller, strips the link layer header off of the frame, assembles a frame in an over-the-air format, which frame includes the encrypted payload, and transmits the over-the-air formatted frame over an air interface.

Yet another embodiment of the present invention encompasses a system that includes a first wireless access network controller that is configured to receive a frame via an air interface, wherein the frame is formatted pursuant to an over-the-air protocol and comprises encrypted payload, demultiplex the frame to separate the encrypted payload, assemble an Intersystem Link Protocol (ISLP) frame that comprises the encrypted payload, encode a particular number of bits in the frame to indicate the frame's coding rate and rate set, and convey the ISLP frame. The system further includes a second wireless access network controller that receives the ISLP frame, determines whether the frame is a valid frame based on a bit count, assembles a frame in an over-the-air format, which frame includes the encrypted payload, and transmits the over-the-air formatted frame over an air interface.

Still another embodiment of the present invention encompasses a method for a mobile station (MS) initiating a switch from a non-clear channel link, wherein payloads are actively processed and altered by both a reverse link access network and a forward link access network, to a clear channel link wherein payloads exchanged between a source MS to a receiving MS are not altered by the access networks. The method includes, subsequent to an initiation of a communication session on the non-clear channel link, conveying a request to a wireless access network to initiate the clear channel link and, in response to conveying the request, receiving a grant of the request.

Yet another embodiment of the present invention encompasses a mobile station (MS) that is configured to initiate a switch from a non-clear channel link, wherein payloads are actively processed and altered by both a reverse link access network and a forward link access network, to a clear channel link wherein payloads exchanged between a source MS to a receiving MS are not altered by the access networks, wherein the mobile station, subsequent to an initiation of a communication session on the non-clear channel link, conveys a request to a wireless access network to initiate the clear channel link and, in response to conveying the request, receives a grant of the request.

The present invention may be more fully described with reference to FIGS. 1-11. FIG. 1 is a block diagram of a wireless communication system 100 in accordance with an embodiment of the present invention. Communication system 100 includes multiple wireless access networks 106, 126 (two shown), such as a Radio Access Network (RAN) or a Base Station (BS), that each provides wireless communications services to mobile stations (MSs) located in a coverage area serviced by the access network via a respective air interface 104, 124. Each air interface 104, 124 includes a forward link having multiple forward link traffic channels and multiple forward link signaling channels. Each air interface 104, 124 further includes a reverse link having an access channel, multiple reverse link traffic channels, and multiple reverse link signaling channels.

Each access network 106, 126 includes a respective wireless transceiver 108, 128, such as a Base Transceiver Station (BTS) or a Node B, coupled to an access network controller 110, 130, such as a Base Station Controller (BSC) or a Radio Network Controller (RNC). Each access network 106, 126 is coupled to a Mobile Switching Center (MSC) 116; however, in another embodiment of the present invention, each access network 106, 126 may be coupled to a MSC different from the MSC coupled to the other access network. MSC 116 may be coupled to an external landline network 105, such as a Public Switched Telephone Network (PSTN), and via the landline network to a landline end terminal 152, such as a landline telephone. Together, access networks 106 and 126 and MSC 116 may be referred to herein as a wireless network 140 and each of access networks 106 and 126, and more particularly transceivers 108 and 128 and access network controllers 10 and 130, and MSC 116 comprises an element of network 140.

Each access network 106, 126, and preferably a respective controller 110, 130 of each access network 106, 126, includes a respective vocoder/Voice Processing Unit (VPU) 112, 132 and a respective clear channel voice/data transcoder 114, 134. However, in other embodiments of the present invention, each of vocoder/VPUs 112, 132 and clear channel voice/data transcoders 114, 134 may be located in a corresponding access network 106, 126 external to, and in communication with, a corresponding controller 110, 130 or their functionality may further reside in an Interworking Function (IWF) 118 of a switch, that is, MSC 116, servicing the access network.

Each vocoder/VPU 112, 132 may comprise a vocoder, such as an Enhanced Variable Rate Coder (EVRC) vocoder or a Qualcomm Code Excited Linear Prediction (QCELP) vocoder, that translates non-encrypted voice and/or may comprise a Transcoder and Voice Processing Unit (VPU) that translates voice, data, and video, which VPU is available from Motorola, Inc., of Schaumburg, Ill. Each vocoder/VPU 112, 132 converts data packets comprising voice, data, and/or video received from an MS serviced by the corresponding access network and formatted pursuant to an over-the-air protocol, for example, an IOS (Inter-Operating System) protocol such as the IS-2000 protocol, to a non-clear channel network transport format for transport through wireless network 140, and in particular a Pulse Code Modulation (PCM) format with respect to voice. Similarly, each vocoder/VPU 112, 132 further converts non-encrypted data packets comprising voice, data, and/or video that is received from an element of wireless network 140 in a non-clear channel network transport format, such as PCM, to an over-the air format for conveyance over-the-air to a destination MS.

As is described in greater detail below, communication system 100 provides a clear channel link or mode of operation for transport of a payload across network 140. In a clear channel mode of operation, a payload is not altered in any way by network 140 when the network transports the payload between a source MS, such as MS 102, and a destination MS, such as MS 122. By contrast, when utilizing a non-clear channel link or mode of operation, payloads are actively processed and altered by both a reverse link access network and subsequently by a forward link access network. In clear channel operation, each clear channel voice/data transcoder 114, 134 strips a Layer 2 over-the-air protocol header off of reverse link encrypted voice, data, and/or video data packets received from an MS serviced by the corresponding access network, includes the received payload in an Intersystem Link Protocol (ISLP) frame, and adds an Intersystem Clear Transport Protocol (ICTP) header to the frame. Each clear channel voice/data transcoder 114, 134 further strips an ICTP header off of ISLP frames received from MSC 116 and converts the payload of each ISLP frame to an IOS format for forward link conveyance over-the-air to a destination MS. In another embodiment of the present invention, instead of, or in addition to, adding an ICTP header to each ISLP frame, a particular number of bits in each ISLP frame may be encoded to indicate the frame's coding rate and rate set. Padding may then be added to the frame to expand the number of bits to an even multiple of eight (8) bits. However, in either event, the encrypted payload is not decrypted or otherwise altered by the access network, thus providing a clear channel link for transport of the payload across network 140.

Figure 2:
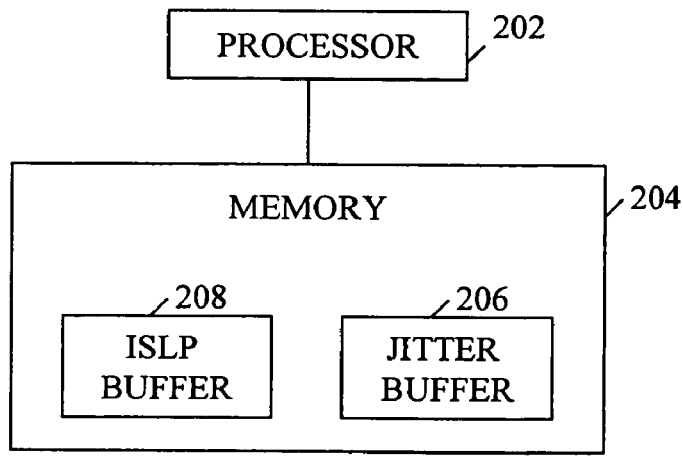
FIG. 2 is a block diagram of an access network controller of FIG. 1 in accordance with an embodiment of the present invention.

FIG. 2 is a block diagram of each of controllers 110, 130 in accordance with an embodiment of the present invention. Each of controllers 110, 130 includes a respective processor 202, such as one or more microprocessors, microcontrollers, digital signal processors (DSPs), combinations thereof or such other devices known to those having ordinary skill in the art. The particular operations/functions of processor 202, and respectively thus of controllers 110 and 130, are determined by an execution of software instructions and routines that are stored in a respective at least one memory device 204 associated with the processor, such as random access memory (RAM), dynamic random access memory (DRAM), and/or read only memory (ROM) or equivalents thereof, that store data and programs that may be executed by the corresponding processor. At least one memory device 204 further includes a jitter buffer 206. Preferably, each of vocoder/VPU 112, 122 and clear channel voice/data transcoders 114, 134 is implemented in a processor 202 of a respective access network controller 110, 130 based on software instructions and routines that are stored in a respective at least one memory device 204 of the controller; however, when a vocoder/VPU 112, 122 or transcoder 114, 134 is located external to the controller, the vocoder/VPU or transcoder may be implemented in a processor of, based on software instructions and routines that are stored in a respective at least one memory device of, the network element comprising the vocoder/VPU or transcoder.

Figure 3:
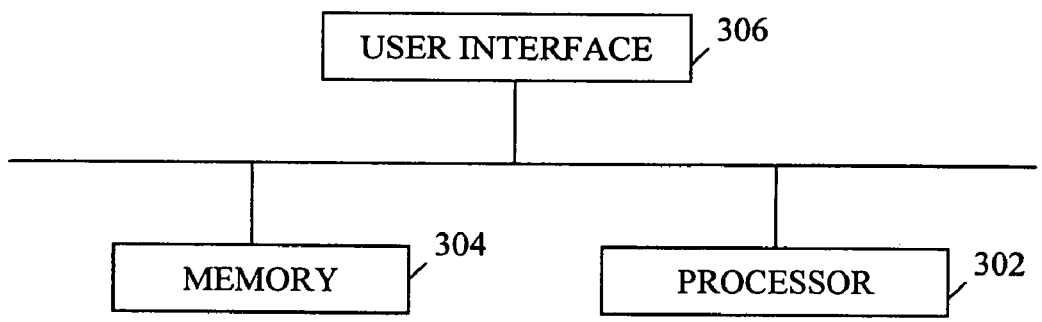
FIG. 3 is a block diagram of a mobile station of FIG. 1 in accordance with an embodiment of the present invention.

Communication system 100 further includes multiple MSs 102, 122 (two shown), such as but not limited to a cellular phone, a radiotelephone, or a wireless communication-enabled personal computer, laptop computer, or personal digital assistant (PDA). As depicted in FIG. 1, a first MS 102 of the multiple MSs 102, 122 is serviced by a first access network 106 of the multiple access networks 106, 126 and a second MS 122 of the multiple MSs 102, 122 is serviced by a second access network 126 of the multiple access networks 106, 126. Referring now to FIG. 3, a block diagram is provided that illustrates each of the multiple MSs 102, 122 in accordance with an embodiment of the present invention. Each of MSs 102 and 122 includes a respective processor 302, such as one or more microprocessors, microcontrollers, digital signal processors (DSPs), combinations thereof or such other devices known to those having ordinary skill in the art. The particular operations/functions of processor 302, and respectively thus of MSs 102 and 122, are determined by an execution of software instructions and routines that are stored in a respective at least one memory device 304 associated with the processor, such as random access memory (RAM), dynamic random access memory (DRAM), and/or read only memory (ROM) or equivalents thereof, that store data and programs that may be executed by the corresponding processor.

Each MS 102, 122 further includes a user interface 306 coupled to the processor 302 that provides a user of the MS with the capability of interacting with the MS, including inputting instructions into the MS. In one embodiment of the present invention, user interface 306 includes a display screen and a keypad that includes multiple keys, including an encryption key. In another embodiment of the present invention, user interface 306 may include a display screen that comprises a touch screen that is able to determine a position (i.e., an X-coordinate and a Y-coordinate) of a user's touch on the touch screen and convey the position data to processor 302. Based on the depression of the key or the position data, processor 302 then translates the user's touch into an instruction. Preferably, the display screen may display a "keypad" screen that comprises multiple softkeys including an encryption softkey.

The embodiments of the present invention preferably are implemented within MSs 102 and 122 and access network controllers 110 and 130, and more particularly with or in software programs and instructions stored in the respective at least one memory device 204, 304 and respectively executed by processors 202, 302 of the MSs and controllers. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the MSs 102, 122 and controllers 110, 130. Based on the present disclosure, one skilled in the art will be readily capable of producing and implementing such software and/or hardware without undo experimentation.

Preferably, communication system 100 is a Code Division Multiple Access (CDMA) communication system that operates in accordance with the 3GPP2 (Third Generation Partnership Project 2) and TIA/EIA (Telecommunications Industry Association/Electronic Industries Association) IS-2000 standards, which provide a compatibility standard for CDMA 2000, including IS-2000 air interfaces and which standards are hereby incorporated herein in their entirety. The standards specify wireless telecommunications system operating protocols, including radio system parameters and call processing procedures. In communication system 100, the communication channels of air interfaces 104 and 124, such as access channels, control channels, paging channels, and traffic channels, comprise orthogonal codes, such as Walsh Codes, that are transmitted in a same frequency bandwidth. However, those who are of ordinary skill in the art realize that communication system 100 may operate in accordance with any one of a variety of communication systems, such as an iDEN® communication system, a Global System for Mobile Communications (GSM) communication system, a Time Division Multiple Access (TDMA) communication system, an Orthogonal Frequency Division Multiplexing (OFDM) communication system, a Universal Mobile Telecommunication System (UMTS) communication system, a Wireless Local Area Network (WLAN) communication system as described by the IEEE (Institute of Electrical and Electronics Engineers) X02.xx standards, for example, the X02.11, X02.15, X02.16, or X02.20 standards, a TD-CDMA (Time Division CDMA) communication system, or a TD-SCDMA (Time Division Synchronous CDMA) communication system.

When an MS, such as MS 102, is operating in a non-encryption mode, the MS conveys non-encrypted payload to the access network serving the MS, that is, access network 106, in a first, over-the-air format. The serving access network, that is, access network 106, in particular vocoder/VPU 112 of access network controller 110 of the access network, converts the data packets to a non-clear channel network transport format, such as a PCM signal with respect to voice, and forwards the reformatted signal to a destination access network, such as access network 126. The destination access network, that is, destination access network 126 and in particular vocoder/VPU 132 of access network controller 130 of the destination access network, converts the network transport formatted signal to data packets formatted pursuant to an IOS protocol and forwards the data packets to a destination MS, that is, MS 122.

Communication system 100 provides for a user of an MS, such as MS 102, that is engaged in a non-encrypted communication session with another MS, such as MS 122, to have an option of converting the communication session to an encrypted communication session wherein encrypted payload is transported over a clear channel link across network 140. By providing a clear channel link for transport of the encrypted payload, the payload is not decrypted by the network and is not susceptible to deciphering by an uninvited participant in the communication session.

Figure 4:
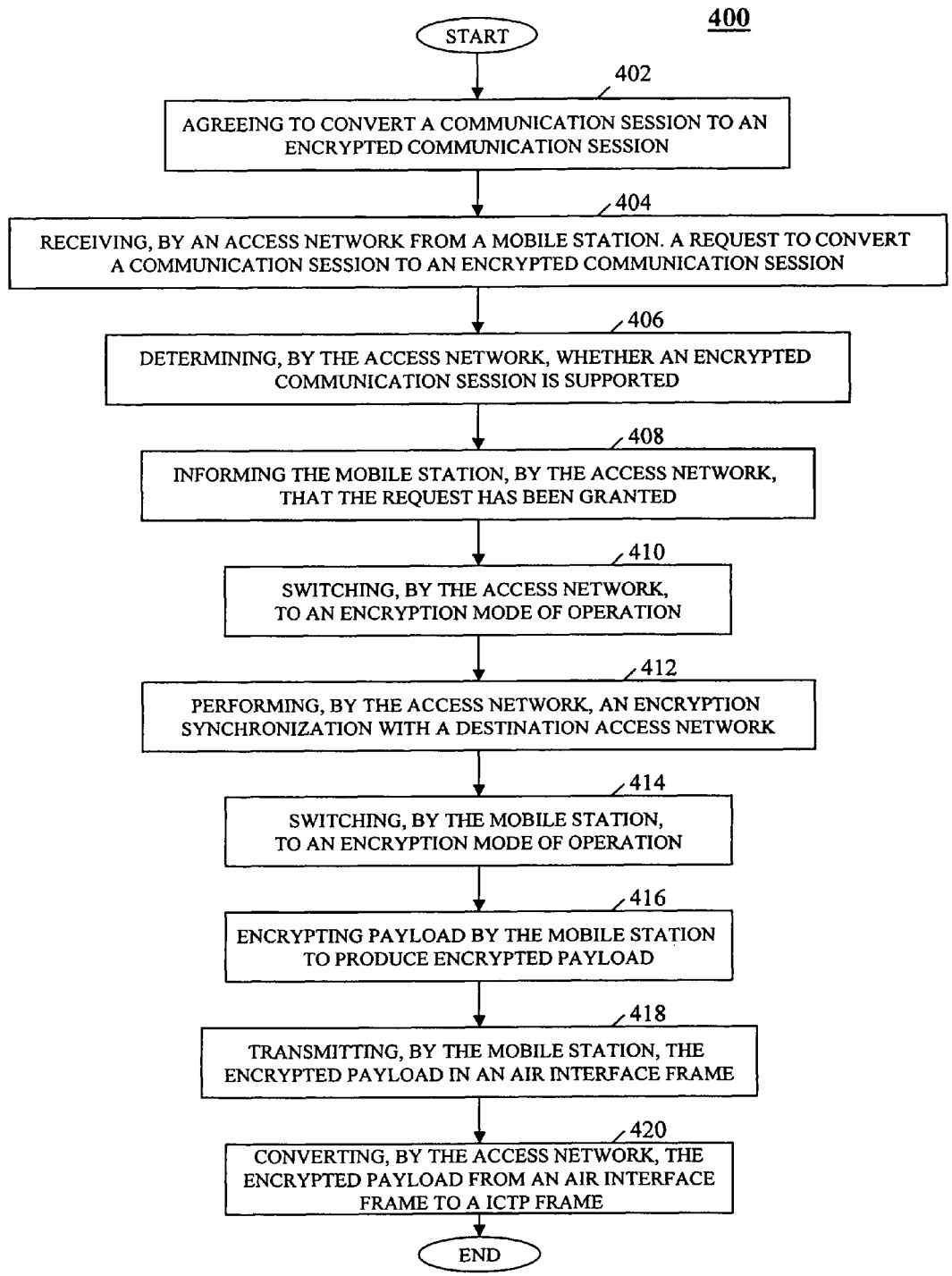
FIG. 4 is a logic flow diagram of a method executed by the communication system of FIG. 1 in converting a non-encrypted communication session to an encrypted communication session in accordance with an embodiment of the present invention.

Referring now to FIG. 4, a logic flow diagram 400 is provided that depicts a method executed by communication system 100 in converting a non-encrypted communication session to an encrypted communication session in accordance with an embodiment of the present invention. Logic flow diagram 400 begins when the end users, that is, the users of MSs 102 and 122, verbally agree (402) to convert the session to encrypted communication session. In order to convert a non-encrypted communication session to an encrypted communication session, a user of each MS 102, 122 instructs the MS to switch to an encryption mode. For example, the user may depress the encryption key (or touch the encryption softkey) in the user interface 306 of the user's MS. In response to receiving the instruction to switch to an encrypted mode, each user's MS 102, 122 conveys to the access network serving the MS, that is, access network 106 with respect to MS 102 and access network 126 with respect to MS 122, and each access network 106, 126 receives (404) from a respective MS 102, 122, a message requesting the access network to initiate a clear channel link across network 140. For example, the request to initiate a clear channel link may comprise a SERVICE REQUEST message that includes a Service Option (SO) value in an SO data field corresponding to a clear channel mode of operation, that is, to utilization of an Intersystem Link Protocol (ISLP) and an Intersystem Clear Transport Protocol (ICTP) layered on top of the ISLP (hereinafter referred to as ICTP/ISLP) for transport of payload across network 140, or may comprise a short message service (SMS) message or a predetermined sequence of Dual Tone Multi- Frequency (DTMF) tones corresponding to a clear channel mode of operation. ICTP is a Layer 2 protocol that operates on an ISLP frame and provides, among other things, Layer 2 synchronization and timing information with respect to an ISLP communication as described in greater detail below.

In response to receiving a request from a served MS to initiate a clear channel mode of operation, each access network 106, 126, and in particular a respective controller 110, 130 of the access network, determines (406) whether the access network, and in particular the controller, supports a clear channel mode of operation, that is, supports ICTP/ISLP. In order to support ICTP/ISLP, the access network includes, or is able to access, a respective clear channel voice/data transcoder 114, 134. If the access network supports ICTP/ISLP, the access network informs (408) the requesting MS that the MS's request has been granted. In addition, a controller 110, 130 of the access network switches (410) to a clear channel mode of operation. In switching to the clear channel mode of operation, the access network 106, 126 switches over from a respective vocoder/VPU 112, 132 to a respective clear channel voice/data transcoder 114, 134 for a processing of frames received from, or intended for, a respective MS 102, 122 serviced by the access network. Each access network controller 110, 130 further performs (412) clear channel synchronization, that is, an ICTP synchronization, with the other access network controller, that is, determines whether the other access network controller is operating in a clear channel, that is, an ICTP/ISLP, mode.

For example, when the request to switch to an encryption mode comprises a SERVICE REQUEST message, an access network 106, 126 that supports operation in an clear channel mode may reply by conveying a SERVICE CONNECT message to the MS that includes a service configuration record in an SO data field informing that the MS's request has been granted and further switches to an clear channel mode, that is, an ICTP/ISLP mode, of operation. In response to being informed that the request to switch to an clear channel mode has been granted, for example, in response to receiving the SERVICE CONNECT message, the MS switches (414) to an encryption mode and begins encrypting (416) payload to produce encrypted payload and transmitting (418) the encrypted payload, in an air interface formatted frame, such as a CDMA air interface format, to the serving access network. In response to receiving the frame, a transceiver of an access network serving the MS, such as transceiver 108 of access network 106 or transceiver 128 of access network 126, converts the payload from an air interface format to an IOS format. The clear channel voice/data transcoder of the access network, that is, clear channel voice/data transcoder 114 of access network 106 or clear channel voice/data transcoder 134 of access network 126, converts (420) the payload from an IOS format to an ICTP format that is then transported to the other access network in an ISLP frame. Logic flow 400 then ends.

Figure 5:
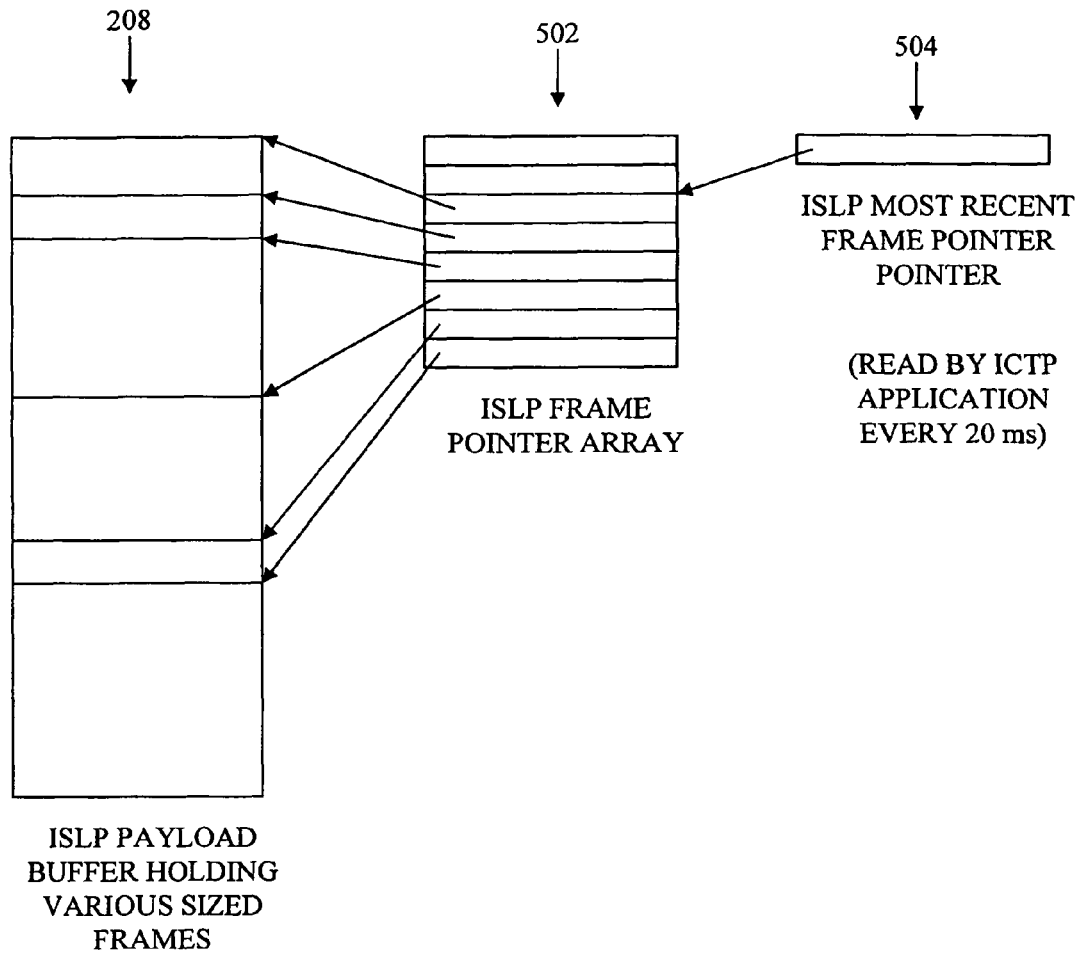
FIG. 5 depicts a payload buffer, an array of pointers to the start of each frame stored in the buffer, and a pointer to a most recent frame pointer in the array that is maintained by an access network controller of FIG. 1 in accordance with an embodiment of the present invention.

In executing steps 410 and 412, each access network controller 110, 130 executes the following steps. With respect to forward link synchronization and transmission of frames received by the controller, when the communication session starts, the controller sets an ICTP state parameter for forward link transmissions (ICTP_Fwd_State) to Idle (ICTP_Fwd_State=Idle) and thereafter supplies unencrypted speech or data received from MSC 116 to a respective vocoder/VPU 112, 132. When the controller receives the request from the MS serviced by the controller to switch to an encryption mode, the controller changes the ICTP_Fwd_State to Initialized (ICTP_Fwd_State=Init) and switches to a respective clear channel voice/data transcoder 114, 134 for a processing of frames received from MSC 116. After switching to the encryption mode, the controller stores frames received from MSC 116 in an ISLP buffer 208 of the at least one memory device 204 of the controller. The controller also generates an array of ISLP frame start pointers that point to the frames stored in ISLP buffer 208 and further generates a pointer to the most recent frame pointer in the array. For example, FIG. 5 depicts an ISLP buffer 208 maintaining multiple frames, an array of pointers 502 to the start of each frame stored in the payload buffer, and a pointer 504 to a most recent frame pointer in array 502, which frames and pointers are maintained by the controller in an at least one memory device 204 of the controller.

Periodically, preferably every 20 milliseconds (ms), the access network controller 110, 130 executes an ICTP application maintained in the at least one memory device 204 of the controller. Upon each execution of the ICTP application, the clear channel voice/data transcoder associated with the controller searches for forward link ICTP synchronization. In particular, each controller 110, 103 maintains a value in association with each of an 'ISLP_Sync_Lost_Count' parameter and an 'ISLP_Sync_Acquired_Count' parameter. These two parameters count a number of times that the underlying ISLP protocol has lost or acquired sync. This check ensures that the underlying ISLP carrier protocol is perfectly stable before even attempting to look at ICTP frames that might be carried on ISLP. Particularly, a PCM byte stream carrying Mu-law or A-law compressed speech from a source access controller that has not yet switched to ICTP processing from EVRC will naturally and frequently insert bytes that resemble the ISLP sync flag. When the controller runs the ICTP application, the clear channel voice/data transcoder of the controller determines whether these two values have changed. If these two parameters, or counters, do not change at all, then it is more certain (not 100%) that ISLP is in fact running and the destination access controller is not receiving PCM from an EVRC vocoder. If these two counters have changed, then the controller may conclude that forward link synchronization has not been achieved. Further, the clear channel voice/data transcoder associated with the controller determines whether any invalid ICTP frames have been received during the intervening 20 ms and whether more than two valid ICTP frames may have arrived. The clear channel voice/data transcoder may determine how many frames have been received since the application was last executed based on the pointer 504 to the most recent frame pointer in array 502. Valid ICTP frames comprise full, half, quarter, and eighth rate frames. The coding rates, and the frame's rate set (RS1 or RS2), may be verified by analyzing one or more of each frame's ICTP header, described in greater detail below, and the frame's bit count. An arrival of more than two valid ICTP frames within the preceding 20 ms period may be considered an ICTP invalid frame condition. When the clear channel voice/data transcoder determines that, during the preceding 20 ms period, ISLP synchronization has remained stable, and no invalid ICTP frames, and no more than two valid ICTP frames, have been received, then the clear channel voice/data transcoder, and correspondingly the associated access network controller, may determine that ICTP forward link synchronization with the other access network controller has been achieved. In response to determining that ICTP forward link synchronization has been achieved, the access network controller sets the ICTP state parameter for forward link transmissions, ICTP_Fwd_State, to indicate that synchronization has been acquired (ICTP_Fwd_State=SyncAcquired).

With respect to reverse link synchronization and transmission of frames received by an access network controller 110, 130 from a respective MS 102, 122 serviced by the controller, when the communication session starts, the access network controller sets an ICTP state parameter for reverse link transmissions (ICTP_Rvs_State) to Idle (ICTP_Rvs_State=Idle). When the access network controller receives the request from the MS serviced by the controller to switch to an encryption mode, the access network controller changes the ICTP_Rvs_State to Initialized (ICTP_Rvs_State=Init) and switches to a respective clear channel voice/data transcoder 114, 134 for a processing of frames received from the serviced MS. As the switch to an encryption mode of operation is due to receipt of a request from the source MS, there is no need for further synchronization with the MS.

Figure 6:
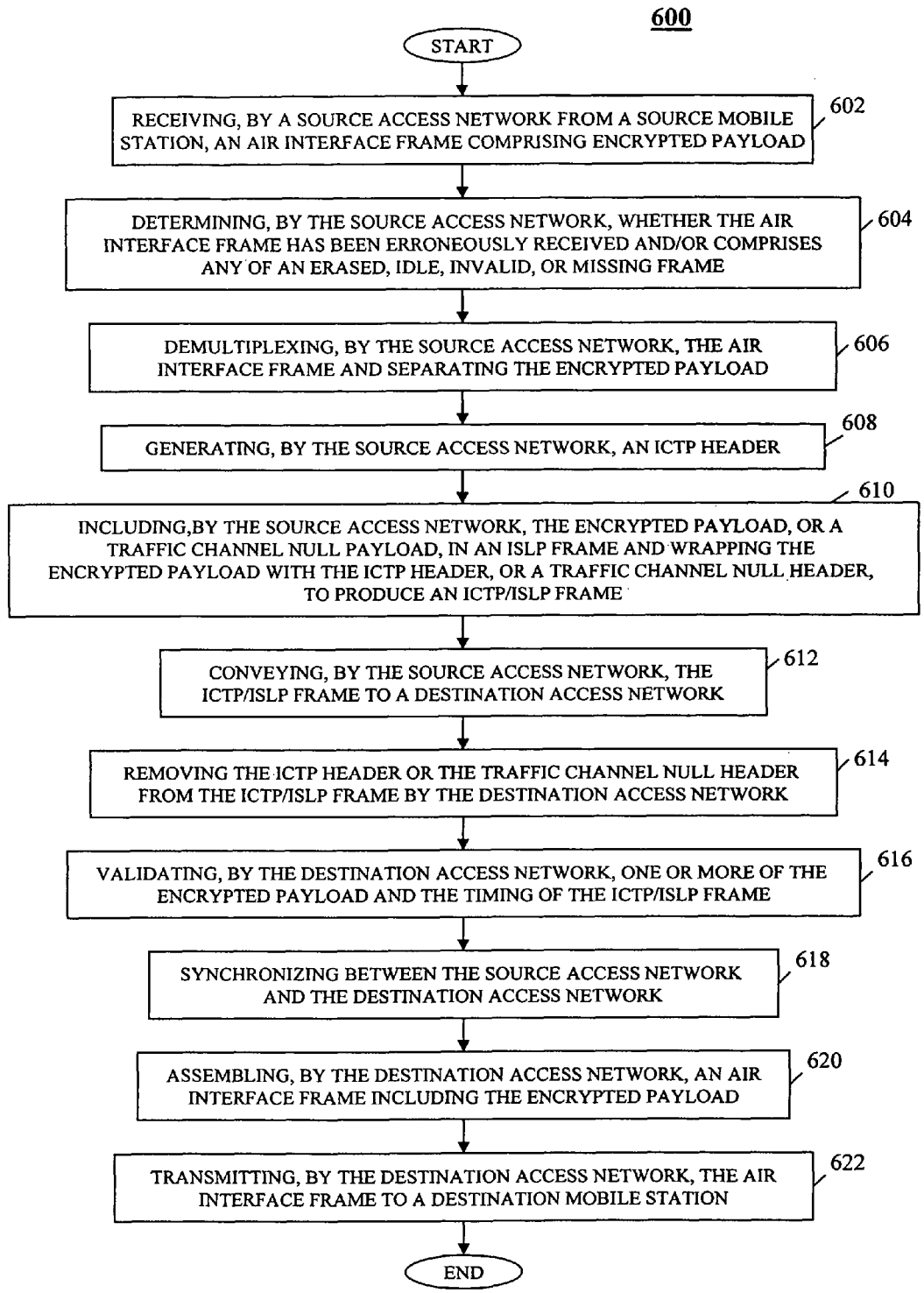
FIG. 6 is a logic flow diagram of a method executed by the wireless network of FIG. 1 in transporting encrypted payload across the network via a clear channel in accordance with an embodiment of the present invention.

FIG. 6 is a logic flow diagram 600 depicting a method executed by wireless network 140 in transporting encrypted payload across wireless the network via a clear channel in accordance with an embodiment of the present invention. For ease of reference and merely for the purpose of illustrating the principles of the present invention, MS 102, access network 106, access network transceiver 108, access network controller 110 are referred to herein as a source MS, access network, access network transceiver, and access network controller, and MS 122, access network 126, access network transceiver 128, access network controller 130 are referred to herein as destination MS, access network, access network transceiver, and access network controller. However, one of ordinary skill in the art realizes that each of MS 102 and MS 122 may operate as either a source MS or a destination MS and, correspondingly, each of access networks 106, 126, access network transceivers 108, 128, and access network controllers 110, 130 may respectively operate as a source access network, access network transceiver, and access network controller or a destination access network, access network transceiver, and access network controller.

Logic flow 600 begins when source access network 106, and in particular transceiver 108, receives (602) an air interface frame comprising encrypted payload from source 102. In response to receiving the frame, transceiver 108 converts the frame from an air interface format to an IOS format. Periodically, preferably every 20 ms, transceiver 108 routes received frames, in the IOS format, to an access network controller 110 associated with the source access network.

In response to receiving the IOS frames from transceiver 108, source access network controller 110 determines (604) whether each frame has been received erroneously and/or comprises any of an erased, idle, invalid, or missing frame. Further, when operating in a clear channel mode, controller 110 routes each received frame to an associated clear channel voice/data transcoder, that is, clear channel voice/data transcoder 114. Clear channel voice/data transcoder 114 demultiplexes (606) the IOS frame and separates the IOS header, encrypted payload, and Layer 2 signaling. Clear channel voice/data transcoder 114 then generates (608) an ICTP header and conveys the encrypted payload and the ICTP header to the ISLP buffer 208 of controller 110. If the IOS frame is an erased, idle, invalid, or missing frame, then the clear channel voice/data transcoder may copy a TCH Null header and a TCH Null payload to the ISLP buffer.

Source access network controller 110 then includes (610) the encrypted payload in a TIA/EIA IS-728 Intersystem Link Protocol (ISLP) frame and wraps the payload with the ICTP header to produce an ICTP/ISLP frame. Access network controller 110 conveys (612) the ICTP/ISLP frame to destination access network 126 via MSC 116 and an ISLP bearer path. Typically, ISLP specifies a 56 kilobits per second (kbps) bearer link. However, the ICTP protocol described herein may be implemented on ISLP running on a 64 kbps bearer link when communication system 100 is 100% configured with 64 kbps clear channel links.

Typically, ISLP frames do not include a header and ISLP merely provides a single 0x7E flag to achieve synchronization. However, the synchronization issues with respect to ICTP are greater, as each of MSs 102 and 122 must activate ICTP independently of the other MS and, as a result, one access network controller 110, 130 may be aware of the ICTP change before the other access network controller. This causes an unsynchronized state where one access network controller is sending ISLP through a PCM decoder as if it were PCM and the other access network controller is sending PCM through an ISLP decoder as if it were ISLP, resulting in harsh noises being conveyed to both MS 102 and 122.

Figure 7:
FIG. 7 is a block diagram of an exemplary Intersystem Link Protocol frame in accordance with an embodiment of the present invention.

By adding the the ICTP header to each ISLP frame, access network controller 110 facilitates synchronization between the source and destination access network controllers 110, 130. The ICTP header is independent of the protocols used to format and encrypt the payload and thereby, together with ISLP, provides a clear channel for transport of the payload across wireless network 140. For example, FIG. 7 is a block diagram of an exemplary ICTP/ISLP frame 700 in accordance with an embodiment of the present invention. ICTP/ISLP frame 700 includes a 'Payload' data field 706 comprising the encrypted payload received from a source MS. In addition, ICTP/ISLP frame 700 further comprises a header that includes a first, 'Type,' data field 702 and a second, 'Sequence,' data field 704. Type data field 702 includes frame type information that may identify one or more of a coding rate of the frame, a rate set (RS) associated with frame, and whether the frame received from the source MS, that is, MS 102, via the corresponding air interface, that is, air interface 104, is corrupted or erased or that no frame has been received when a frame was expected. For example, Type data field 702 may include any one of the following four-bit sequences:

| | |
|---|---|
| 0x1 | RS1 Full Rate |
| 0x2 | RS1 Half Rate |
| 0x3 | RS1 Quarter Rate |
| 0x4 | RS1 Eighth Rate |
| 0x5 | RS2 Full Rate |
| 0x6 | RS2 Half Rate |
| 0x7 | RS2 Quarter Rate |
| 0x8 | RS2 Eighth Rate |
| 0x9 | Reserved |
| 0xA | Reserved |
| 0xB | Reserved |
| 0xC | Reserved |
| 0xD | Corrupt Frame received from air interface |
| 0xE | Erasure Frame received from air interface |
| 0xF | No Frame received from air interface |

Sequence data field 704 comprises a sequence number that indicates a sequential relationship of the ICTP/ISLP frame relative to the other ICTP/ISLP frames comprising payload received from the source MS. Preferably, Sequence data field 704 may include any one of the four-bit sequences ranging from 0x0 to 0xF. The type and sequence values respectively inserted in Type and Sequence data fields 702, 704 may be values extracted from the IOS frame received by source BS 106. However, in another embodiment of the present invention, the sequence number included in Sequence data field 704 may comprise the lower four bits of a Universal Time Constant (UTC) corresponding to a time that the source access network, that is, access network 106, received the frame of payload. In yet another embodiment of the present invention, the values inserted in Sequence data field 704 may comprise a running sequence of values determined by access network controller 110 independent of the IOS header of each received frame, wherein the value included in each frame is one greater than the value included in the previous frame until the values roll over. A destination access network, such as access network 126, may then use the sequence number of the ICTP frames to ensure proper transmission timing of the air interface frames to a destination MS, such as MS 122, as encrypted vocoders in the destination MS may require that no accidental advancement or delay of the stream of frames with respect to each other occurs in order for an encryption algorithm to operate correctly.

Payload data field 706 includes the encrypted contents of the payload received form the source MS. However, source access network controller 110 may strip off any link layer header and/or padding added to the payload by source MS 102 prior to the controller assembling the ISLP frame and adding the ICTP header to the ISLP frame. When source access network controller 110 determines a frame received from a served MS is a corrupt frame, an erased frame, or that no frame has been received when a frame was expected, the access network controller may indicate such by including one of types 0xD, 0xE, and 0xF in Type data field 702. In such an instance, the access network controller may further include a null traffic channel (TCH Null) payload in Payload data field 706 instead of the received payload, such as a bit sequence comprising 0xFFFF for RS1 or 0xFFFF00 for RS2.

In another embodiment of the present invention, instead of, or in addition to, adding an ICTP header to each ISLP frame, a particular number of bits in each ISLP frame may be encoded to indicate the frame's coding rate and rate set. Padding may then be added to the frame to expand the number of bits to an even multiple of eight (8) bits. In the embodiment where a header is not used, for incorrectly received frames, the access network controller may transmit precisely 20 ms of ISLP Idle pattern. This retains synchronization with the other, receiving access network controller while giving a (passive) indication that the payload is, in fact, null.

In yet another embodiment of the present invention, when a source access network receives, via an associated air interface, an erasure or a corrupt frame, or no frame is received, an access network controller of the access network may insert a one frame gap in ICTP/ISLP transmissions and/or may skip sequence numbers in the ICTP/ISLP transmissions in order to facilitate synchronization. Correspondingly, when a destination access network receives ICTP/ISLP frames with a one frame gap, the access network controller of the destination access network may substitute one frame of null null traffic channel on the associated air interface, and when a destination access network receives ICTP/ISLP frames with non-sequential sequence numbers, missing sequence numbers, or repeated sequence numbers, the access network controller of the destination access network may provide compensation in the air interface frame timing.

Referring again to FIG. 6, when destination access network 126 receives the ICTP/ISLP frame, the destination access network routes the frame to the access network controller of the destination access network, that is, destination access network controller 130. Assuming that destination access network controller 130 is operating in a clear channel, or ICTP/ISLP, mode, the destination access network controller routes the ICTP/ISLP frame to clear channel voice/data transcoder 134 and the transcoder removes (614) the ICTP header from the frame. Based on the ICTP header, destination access network controller 130 may validate (616) one or more of the encrypted payload included in the frame and the timing of the frame and may further provide (618) synchronization between the source and destination access networks 106 and 126. One of ordinary skill in the art realizes that encryption algorithms running on MSs 102 and 122 may require that no accidental advancement or delay of a stream of frames with respect to each other occurs in order for the encryption algorithm to operate correctly. Clear channel voice/data transcoder 134 of destination access network controller 130 then converts the frame from an ICTP format to an IOS format and destination access network controller 130 routes the frame to transceiver 128. Transceiver 128 then assembles (620) an air interface frame comprising the payload and transmits (622) the frame to destination MS 122 via a forward link traffic channel of air interface 124. Logic flow 600 then ends.

Figure 8:
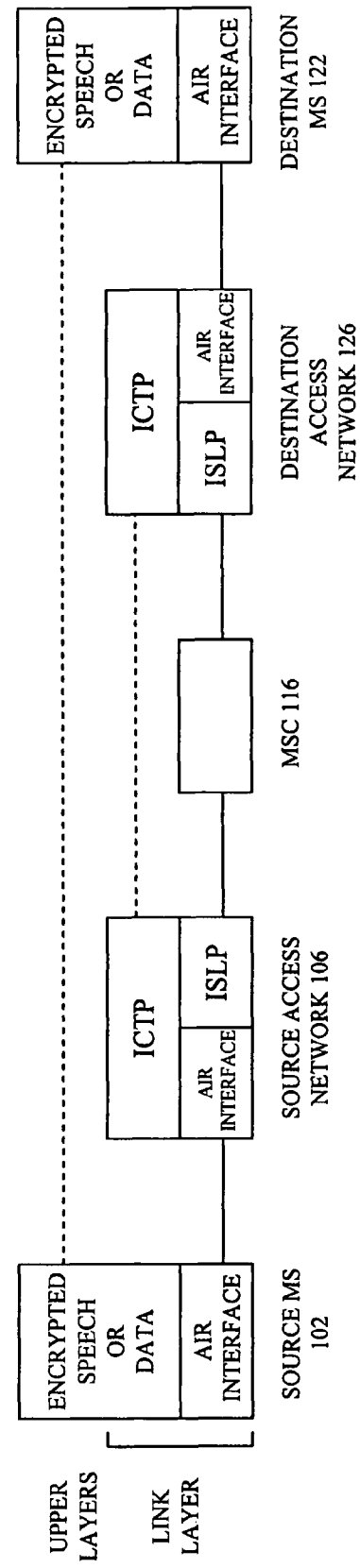
FIG. 8 is an architecture of the wireless communication system of FIG. 1 in accordance with an embodiment of the present invention.

FIG. 8 is a block diagram 800 depicting an architecture of communication system 100 in accordance with an embodiment of the present invention. A link layer of source MS 102 receives payload from the upper layers of the MS, such as speech, data, and/or video, and includes the data in frame that is formatted pursuant to an air interface format, such as a frame formatted pursuant to the IS-2000 protocol. Source MS 102 then conveys the frame via a reverse link traffic channel of air interface 104 to source access network 106. In response to receiving the frame, source access network 106 routes the received frame to source access network controller 110. A link layer of access network controller 110 strips off the IS-2000 header, re-formats the frame as an ISLP frame, adds an ICTP header to the frame to produce an ICTP/ISLP frame, and forwards the ICTP/ISLP frame to destination access network 126 via MSC 116. The conveyance of the ICTP/ISLP frame from source access network 106 to destination access network 126 may be transparent to MSC 116. However, in another embodiment of the present invention and as described in greater detail below, an ICTP layer further may be implemented as an Interworking Function (IWF) 118 collocated at MSC 116, providing MSC 116 with the ICTP/ISLP functionality that is described herein with respect to controllers 110 and 130 and thereby permitting employment of an encrypted communication session between an MS 102, 122 and a landline end terminal 152.

In response to receiving the ICTP/ISLP frame, destination access network 126 then routes the received ICTP/ISLP frame to destination access network controller 130. A link layer of access network controller 130 strips off the ICTP header, re-formats the frame as an air interface frame, such as an IS-2000 frame, and forwards the frame via a forward link traffic channel of air interface 124 to destination MS 122. Based on the ICTP header, access network controller 130 may further validate one or more of the payload included in the frame and the timing of the ICTP/ISLP frame received from source controller 110 and may further provide synchronization between the source and destination access networks 106 and 126. When destination MS 122 receives the air interface frame, the MS strips the IS-2000 header off of the frame and forwards the payload included in the frame to the upper layers of the MS.

By providing that a source access network include encrypted payload in an ISLP frame without decrypting the payload, and then wrapping the ISLP frame with a link layer header that identifies one or more of frame type information and a sequence value associated with the frame or encoding a particular number of bits of the ISLP frame to indicate the frame's coding rate and rate set, communication system 100 provides a clear channel for transport of the encrypted payload across a corresponding wireless network. The source access network conveys the ISLP frame, with the added header and/or encoded bits, across the network, for example, to a destination access network. Based on the added header and/or a bit count associated with the ISLP frame, the source and destination access networks are able to perform clear channel synchronization. By providing a clear channel link for transport of the encrypted payload, the payload is not decrypted by the network and is not susceptible to deciphering by an uninvited participant in the communication session. Further, communication system 100 permits an MS to convert a non-encrypted communication session to an encrypted communication session by conveying, to an access network serving the MS, a request to convert to a clear channel mode of operation. A problem may then arise when an access network controller serving one MS participating in the communication session may be aware of the change to a clear channel mode before an access network controller serving another MS participating in the communication session. Clear channel synchronization may then be used to help resolve the problem of one of the two access network controllers sending ISLP through a PCM decoder as if it were PCM and the other of the two access network controllers sending PCM through an ISLP decoder as if it were ISLP, resulting in harsh noises being conveyed to MSs serviced by the access network controllers.

As noted above, when multiple MSs 102, 122 are participating in a communication session, an instructing of each access network 106, 126 by a respective MS 102, 122 to operate in a clear channel mode may occur independently of an instructing of the other access network, by the other MS, to operate in a clear channel mode. Since each user conveys his or her instruction independent of the conveyance of an instruction by the other MS, and correspondingly the access network controller 110, 130 of each access network 106, 126 converts to a clear channel mode of operation independently of the conversion to a clear channel mode by the other access network controller. As a result, a synchronization issue may arise where one MS, and the access network controller serving that MS, may be operating in a clear channel mode while the other MS and access network controller may still be operating in a non-clear channel mode.

When one access network controller and MS are operating in a clear channel mode and the other access network controller and MS are not, communications may break down. For example, one access network controller may be sending ICTP/ISLP frames through a vocoder/VPU as if the frames were non-encrypted voice/data and the other controller may be sending non-encrypted voice/data through a clear channel voice/data transcoder as if the frames were encrypted voice/data, resulting in harsh noises being conveyed to both MS 102 and MS 122.

In order to avoid the resulting harsh noise that might end up being conveyed to the MSs, communication system 100 provides for ICTP synchronization. That is, assume that after a communication session begins and the users of the MSs 102, 122 verbally agree to switch to a clear channel, that is, an ICTP/ISLP, mode of operation, a first MS, for example, MS 102, and a first access network servicing the first MS, that is, access network 106, switch to a clear channel mode of operation while a second MS, that is, MS 122, and a second access network servicing the second MS, that is, access network 126, has not yet switched. As a result, the first access network 106 may continue to receive non-encrypted voice/data frames from the second access network 126 while the second access network receives ICTP/ISLP frames from the first access network.

To deal with such a situation, after converting to a clear channel mode of operation, access network controller 110 of the first access network 106 monitors the stream of frames received from second access network 126 for forward link transmission to MS 102 to detect forward link synchronization. That is, during a monitoring time period following the conversion to a clear channel mode of operation, controller 110 monitors the stream of frames received from second access network 126 for ICTP/ISLP frames. When operating in an ICTP state, controller 110 periodically, preferably every 20 milliseconds (ms), runs an ICTP application stored in the at least one memory device 204 of the controller. Controller 110 maintains a 'ISLP_Sync_Lost_Count' value and a 'ISLP_Sync_Acquired_Count' value. When controller 110 again runs the ICTP application 20 ms later and these two values have changed, that indicates that ISLP synchronization has not been achieved. In addition, if ISLP synchronization has been achieved, then during the preceding 20 ms controller 110 must not have received any invalid ICTP/ISLP frames and no more than two valid ICTP/ISLP frames may have arrived. Valid ICTP/ISLP frames comprise full, half, quarter, and eighth rate frames whose coding rates, and rates sets, may be confirmed by analyzing one or more of their ICTP header and their bit count. An arrival of more than two valid ICTP/ISLP frames within the preceding 20 ms may be considered an ICTP/ISLP invalid frame condition. When controller 110 determines that, during the intervening 20 ms, ISLP synchronization has remained stable and no invalid ICTP/ISLP frames, and no more than two valid ICTP/ISLP frames, have been received, then the controller may assume that ICTP synchronization with controller 130 of second access network 126 has been achieved. By monitoring these parameters, controller 110 imposes an ICTP synchronization on top of the ISLP service. Meanwhile, while waiting to detect synchronization, that is, a conversion by second access network 126 to a clear channel mode of operation, controller 110 may transmit traffic channel null frames, such as CDMA TCH Null, to first MS 102 to prevent any harsh noises.

Meanwhile, prior to conversion to a clear channel mode of operation, second access network 126 is still routing frames received from first access network 106 to vocoder/VPU 132. In order to avoid the loud tones and other unacceptable audio effects that may result from a vocoding of ICTP/ISLP frames, first access network 122, and more particularly controller 110 of the first access network, may forward a hybrid ISLP/PCM stream to the second access network instead of the payload received from first MS 102 until forward link synchronization is detected by the first access network. The hybrid ISLP/PCM stream comprises a PCM stream that includes start/end ISLP flags that are selected to not produce audio artifacts when decoded by a PCM Mu-law or A-law decoder. Between the flags are PCM samples for soft Gaussian noise that is comfortable to hear. This pattern may be sent any time an unsynchronized state is detected. The conveyance of the hybrid ISLP/PCM frames may further be used by a controller 110, 130 to signal a transition in or out of a clear channel mode of operation. Alternatively, out-of-band signaling may be used to convey a clear channel status between the access networks 110, 130.

Preferably, the hybrid ISLP/PCM stream comprises ITU-T (International Telecommunication Union Telecommunication Standardization Sector) G.711 Mu-law and A-law sequences that will allow transmission of IS-718 ISLP flags without audio degradation during ICTP service option switchover. In determining a desired hybrid ISLP/PCM stream, initial ICTP simulations of unsynchronized conditions have shown that a loud tone with a 1 kilohertz (kHz) fundamental is generated by sending consecutive rotating ISLP flag words. As this is unacceptable, a review of the ISLP flags and their corresponding Mu-law and A-law representations indicated that, by using two of these consecutive flags that correspond to small-valued PCM samples, the tone could be eliminated with insertion of ISLP payloads of Gaussian 'comfort' noise between these flags.

Using a 56 kbps ISLP channel (7-bit PCM samples where the least significant bit is reserved for robbed bit signaling), the ISLP framing flag takes on the following values in successive binary PCM samples:

| Sample | #1 | Hex | Sample | #2 | Hex |
|--------|------|-----|--------|------|-----|
| 0111 | 111X | 7E | 0ZZZ | ZZZX | 00 |
| Z011 | 111X | 3E | 10ZZ | ZZZX | 80 |
| ZZ01 | 111X | 1E | 110Z | ZZZX | C0 |
| ZZZ0 | 111X | 0E | 1110 | ZZZX | E0 |
| ZZZZ | 011X | 06 | 1111 | 0ZZX | F0 |
| ZZZZ | Z01X | 02 | 1111 | 10ZX | F8 |
| ZZZZ | ZZ0X | 00 | 1111 | 110X | FC | where X is the unused bit (reserved RBS (robbed bit signaling) bit) and Z is the 'don't care' bit. For the hex values, the X and Z bits are set to zero. By selecting the ISLP flags that map to a 'quiet' value of the G.711 Mu-law or A-law codeword, it is possible to insert ISLP flags in a PCM stream without incurring objectionable audio noises. In addition, masking of the intermediate Mu-law or A-law samples are needed to prevent falsing of these values as ISLP flags (6 or more consecutive ones must be suppressed). This masking is selected based on the chosen codeword from the above table.

The following chart converts the ISLP Flag PCM values, shifted through all eight shifts and mapped into the upper 7 bits of the PCM octet. The PCM values are expanded into their corresponding 2's complement linear representations for both G.711 modes. The G.711 samples that have the smallest magnitude are underscored.

| ISLP Flag PCM Value In Hexadecimal | Mu-law linear | A-law linear |
|------|------|------|
| 7E | FFF8 | FC90 |
| 3E | F8C4 | CZ00 |
| 9E | 227C | 0DC0 |
| CE | 03DE | <u>01B8</u> |
| E6 | 0116 | 04E0 |
| F2 | 0068 | 02F0 |
| F8 | 0038 | 03B0 |
| FC | <u>0018</u> | 0330 |

One may note that the complete flag is not contained in these single PCM values and the remaining bits of the flag are found in the subsequent PCM byte. In this list, this would be the ISLP flag on the following line.

The following UNIX ksh script describes how to generate the desired hybrid ISLP/PCM stream:

```
Usage: islp_tst m −60
Arguments of script:
1:      Companding mode: a= Alaw, m = Mu-law
2:      Level of Gaussian noise added in dBFS
Source of islp_tst:
==================
#!/usr/bin/ksh
# (c) Motorola GTSS 2004 Michael Kirk
export P=/home/kirk/bin/playecz2
export NL=$2
export REP=158
# companding law: a (Alaw) or m (Mu)
export C=$1
case $C in
  a) Q=54;;
  m) Q=7c;;
  *) echo "Unknown arg 1, needs to be 'a' or 'm'"; exit 1;;
esac
# generate gaussian with masking
rep −x 0 −c 32000 −m 3 | gnoise ${NL} | 12m8 | bitshift −m f9 > outgm.bin
rep −x 0 −c 32000 −m 3 | gnoise ${NL} | 12a8 | bitshift −m f9 > outga.bin
# generate masking file to clear noise samples to insert 2 ISLP flags
echo "0\n0\n" | asc2byte > imask.bin
rep −x ff −c $REP −m 4 >> imask.bin
rep −i imask.bin −c 200 > imask2.bin
#mask (clear) noise samples
and_bits outgm.bin imask2.bin igm.bin
and_bits outga.bin imask2.bin iga.bin
#generate ISLP flag file
echo "f8\nfc\n" | asc2byte > iflag.bin
rep −x 0 −c $REP −m 4 >> iflag.bin
rep −i iflag.bin −c 200 > iout.bin
#merge binary byte files and convert to linear PCM
or_bits < iout.bin igm.bin > igm.islp
m821 < igm.islp > outgm.sig
or_bits < iout.bin iga.bin > iga.islp
a821 < iga.islp > outga.sig
# check files for ISLP flags
decode_islpx igm.islp out.data
decode_islpx iga.islp out.data
echo "Playing Mu-law"
$P outgm.sig
sig2wav8m outgm.sig outgm.wav
echo "Playing A-law"
$P outga.sig
sig2wav8a outga.sig outga.wav
```

A slight 'buzz' sound may be audible in the A-law version due to the ISLP flags having a larger amplitude value in A-law than in Mu-law. The two flags are sent every 160 samples with the remaining 158 samples containing Gaussian noise. The Gaussian noise samples are masked to prevent ISLP flag word falsing (that is, 6 consecutive 1's) and ISLP 'kill' frames (that is, more than 6 consecutive 1's). The A-law file has a noise level of approximately −49 dBm and the Mu-law file has a noise level of approximately −51 dBm. These levels can be adjusted up or down as needed. At −42 dBm, the A-law 'buzz' is masked by the level of the Gaussian noise.

Figure 9:
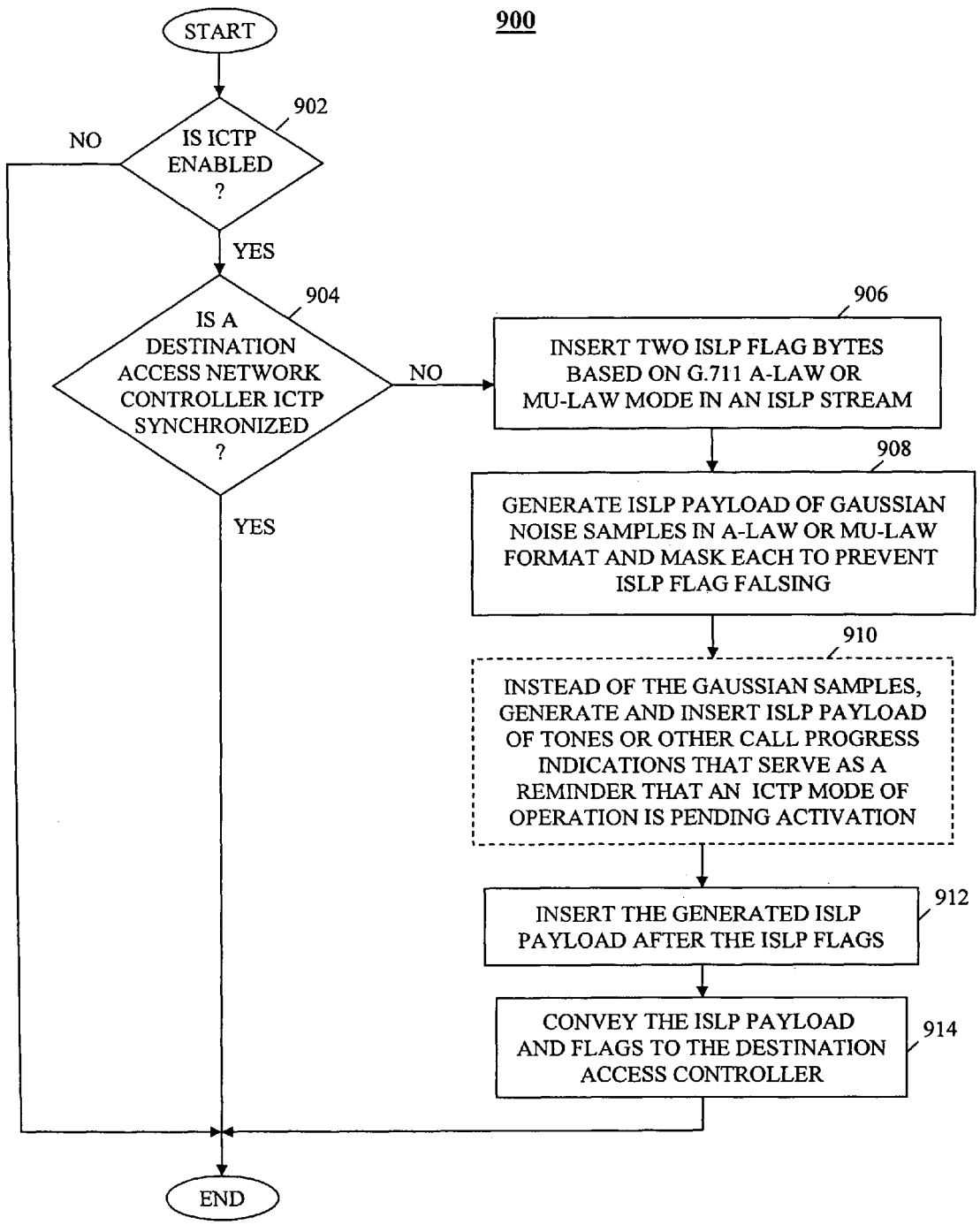
FIG. 9 is a logic flow diagram of a method executed by a source access network controller of FIG. 1 in generating a hybrid Intersystem Link Protocol/Pulse Code Modulation (ISLP/PCM) stream to a destination access network controller in accordance with an embodiment of the present invention.

Referring now to FIG. 9, a logic flow diagram 900 is provided that illustrates an execution by source access network controller 110 of a method of generating a hybrid ISLP/PCM stream to destination access network controller 130 when the destination access network controller is not yet determined to be operating in a clear channel mode in accordance with an embodiment of the present invention. Logic flow diagram 900 begins when a controller of source access network 110, that is, access network controller 110, determines (902) whether the access network controller is operating in a clear channel mode, that is, whether ICTP is enabled by the access network controller. If source access network controller 110 is not operating in a clear channel mode, that is, does not have ICTP enabled, then logic flow 900 ends.

If source access network controller 110 is operating in an clear channel mode, that is, has ICTP enabled, then the controller determines (904) whether a destination access network controller, that is, access network controller 130, is synchronized, that is, is also operating in a clear channel mode, that is, has ICTP enabled. If destination access network controller 130 is synchronized then logic flow 900 ends. If destination access network controller 130 is not synchronized, then source access network controller 110 inserts (906) two ISLP Flag bytes based on G.711 Mu-law or A-law in a PCM stream. Source access network controller 110 further generates (908) ISLP payload of Gaussian noise samples in G.711 Mu-law or A-law format and masks each in order to prevent ISLP flag falsing (the length of the payload is selectable) and inserts (912) the generated payload after the ISLP flags. Controller 110 then conveys (914) the two ISLP Flag bytes and the ISLP payload to destination access network controller 130 and logic flow 900 then ends. However, in another embodiment of the present invention, access network controller 110 may further, on a periodic or non-periodic basis, generate (910) ISLP payload of tones or other call progress indications in the ISLP stream to remind destination access network controller 130 that a clear channel mode of operation, that is, and ICTP/ISLP mode of operation, is pending activation and, at step 912, insert the ISLP payload of tones or other call progress indications instead of the Gaussian noise.

In another embodiment of the present invention, when one access network controller, for example, access network controller 130, is not operating in a clear channel mode, the access network controller may monitor the PCM stream received from another access controller involved in a communication session, for example, access network controller 110, to detect ISLP framing. When access network controller 130 detects a receipt of ICTP/ISLP frames from access network controller 110, access network controller 130 may block a routing of such frames to vocoder/VPU 132 and instead arrange for the vocoder/VPU to generate comfort noise for conveyance to MS 122. Further, in response to detecting a receipt of ICTP/ISLP frames from access network controller 110, access network controller 130 may automatically enable ICTP and begin routing frames to clear channel voice/data transcoder 134 and may further request the MS served by the access network controller, that is, MS 122, to switch to an encrypted mode of operation.

Figure 10:
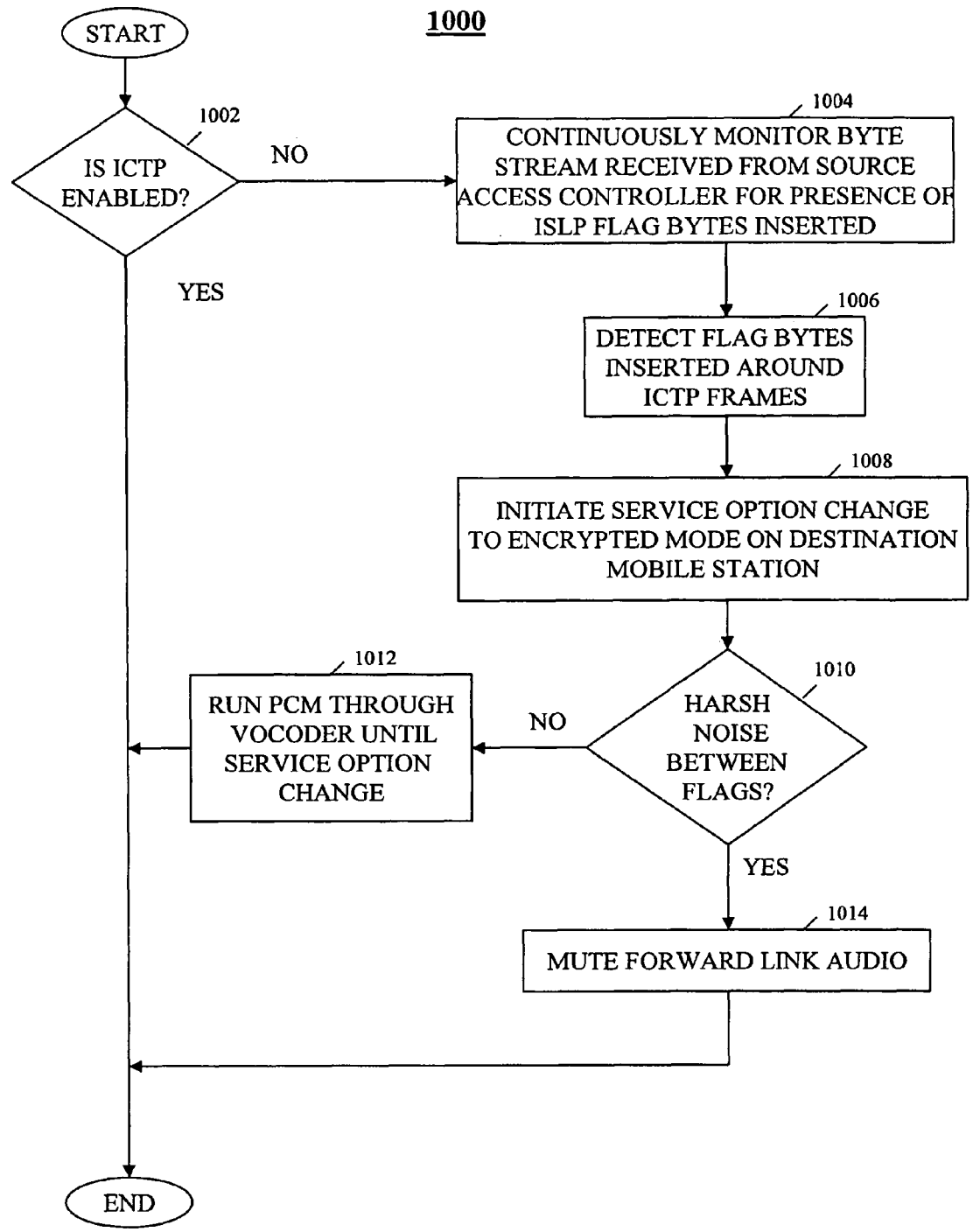
FIG. 10 is a logic flow diagram of a method executed by a destination access network controller of FIG. 1 that is not currently operating in a clear channel mode to continuously monitor a byte stream from a source access network controller of FIG. 1 for the presence of hybrid ISLP/PCM to trigger a transition to a clear channel mode of operation and an encrypted communication session before a destination mobile station has requested an encrypted communication session in accordance with an embodiment of the present invention.

FIG. 10 is a logic flow diagram 1000 of a method executed by destination access network controller 130, when not operating in a clear channel mode, to monitor a byte stream from source access network controller 110 for the presence of hybrid ISLP/PCM to trigger a transition to a clear channel mode of operation and an encrypted communication session before destination MS 122 has requested an encrypted communication session. Alternatively, the destination controller may continuously monitor for the presence of fully converted ICTP frames in ISLP framing to perform the same transition. Logic flow diagram 1000 begins when a destination access network controller, for example, access network controller 130, determines (1002) whether the access network controller is operating in a clear channel mode, that is, whether ICTP is enabled by the access network controller. If access network controller 130 is operating in a clear channel mode, that is, has ICTP enabled, then logic flow 1000 ends.

If destination access network controller 130 is not operating in a clear channel mode, that is, does not have ICTP enabled, then the controller continuously monitors (1004) a byte stream sourced by a source access network controller, for example, access network controller 110, for the presence of the two ISLP Flag bytes inserted by the source access network controller in a PCM stream, as described above with respect to step 906 of logic flow diagram 900. In response to detecting (1006) the two ISLP Flag bytes and when a clear channel mode of operation has not yet been requested by a destination MS, that is, MS 122, destination access network controller 130 instructs (1008) the destination MS to transition to an encrypted mode of operation. For example, destination access network controller 130 may request a Service Option change by the destination MS, wherein the requested Service Option corresponds to an encrypted mode of operation by the destination MS (and a clear channel mode of operation by the controller). Further, in response to detecting the two ISLP Flag bytes, destination access network controller 130 determines (1010) whether there is harsh noise between the two flags.

If harsh noise is not detected, then destination access network controller 130 continues to run (1012) the PCM stream through vocoder/VPU 132 until the destination access network controller receives confirmation from destination MS 122 of a Service Option change. If harsh noise is detected, then destination access network controller 130 mutes (1014) forward link audio. Upon receiving confirmation of the Service Option change destination access network controller 130 ceases muting forward link audio (if forward link audio was being muted), switches to clear channel voice/data transcoder 134 for a processing of data packets received from, and intended for, destination MS 122, and begins converting payload of received ICTP/ISLP frames to air interface frames. Logic flow 1000 then ends.

Figure 11:
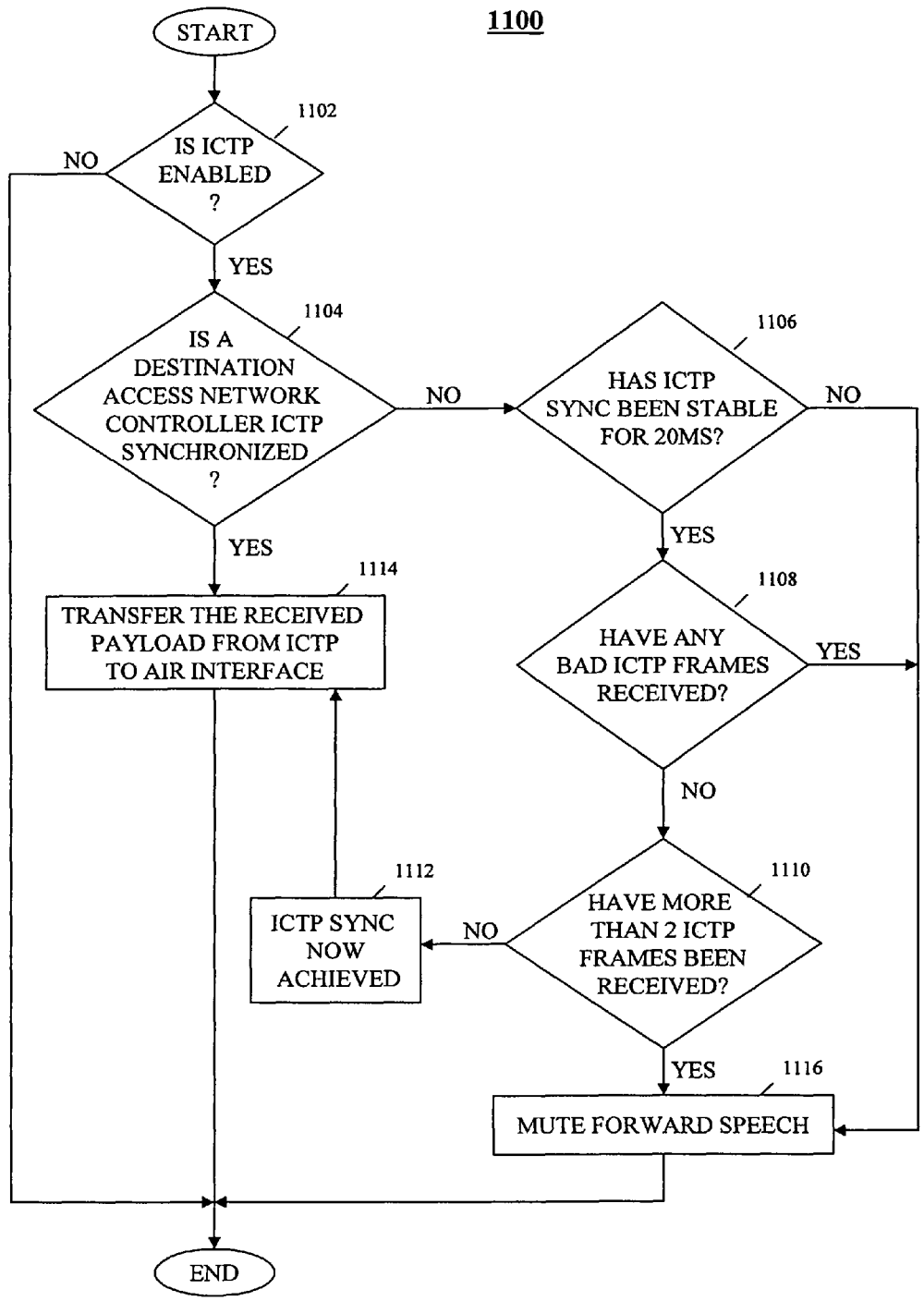
FIG. 11 is a logic flow diagram of a method executed by a destination access network controller of FIG. 1 that is currently operating in a clear channel mode to continuously monitor a byte stream from a source access network controller of FIG. 1 for the presence of Intersystem Clear Transport Protocol (ICTP) frames within a byte stream in order to allow a transition from a state of muting forward payload to a state of converting the payload from ICTP/ISLP frames into air interface frames in accordance with an embodiment of the present invention.

FIG. 11 is a logic flow diagram 1100 of a method executed by destination access network controller 130, when operating in a clear channel mode, to continuously monitor a byte stream from source access network controller 110 for the presence of ICTP frames within an ISLP byte stream in order to allow a transition from a state of muting forward payload to a state of converting the payload from ICTP into air interface packets in accordance with an embodiment of the present invention. Logic flow diagram 1100 begins when a destination access network controller 130 determines (1102) whether the destination access network controller is operating in a clear channel mode, that is, whether ICTP is enabled by the access network controller. If destination access network controller 130 is not operating in a clear channel mode, that is, does not have ICTP enabled, then logic flow 1100 ends.

If destination access network controller 130 is operating in a clear channel mode, that is, has ICTP enabled, then the destination access network controller determines (1104) whether it is ICTP synchronized with source access network controller 110. If destination access network controller 130 determines that it is ICTP synchronized with source access network controller 110, then the destination access network controller 130 utilizes clear channel voice/data transcoder 134 for a processing of data packets received from, and intended for, MS 122, and begins converting (1114) payload of received ICTP/ISLP frames to air interface frames. Logic flow 1100 then ends.

If destination access network controller 130 determines that it is not ICTP synchronized with source access network controller 110, then the destination access network controller 130 determines (1106, 1108, 1110) whether ICTP synchronization has been stable since the controller last executed an ICTP application, preferably a 20 ms interval, whether any invalid ICTP frames have been received during the preceding 20 ms interval, and/or whether more than two valid ICTP frames may have arrived in the preceding 20 ms interval. When ICTP synchronization has not been stable, invalid ICTP frames have been received, or more than two valid ICTP frames have arrived in the preceding 20 ms interval, then destination access network controller 130 mutes forward link audio, or continues to mute forward link audio if it is already muted, and logic flow 1100 ends. When ICTP synchronization has been stable, invalid ICTP frames have not been received, and no more than two valid ICTP frames have arrived in the preceding 20 ms interval, then destination access network controller 130 determines (1112) that ICTP synchronization with source access network controller 110 has been achieved. In response to determining that ICTP synchronization has been achieved, destination access network controller 130 utilizes clear channel voice/data transcoder 134 for a processing of data packets received from, and intended for, MS 122, and begins converting (1114) payload of received ICTP/ISLP frames to air interface frames. Logic flow 1100 then ends.

Thus until forward link synchronization is detected, communication system 100 provides for a muting of a forward audio link, or a generation of a hybrid ISLP/PCM stream, in order to minimize the harsh noise that otherwise may be conveyed by an access network to a served MS prior to detection of forward link clear channel synchronization. The hybrid ISLP/PCM stream comprises a PCM stream that includes start/end ISLP flags that are selected to not produce audio artifacts when decoded by a PCM Mu-law or A-law decoder. Between the flags are PCM samples for soft Gaussian noise that is comfortable to hear. This pattern may be sent any time an unsynchronized state is detected. Communication system 100 further provides for a destination access network controller, when not operating in a clear channel mode, to monitor a byte stream from source access network controller for the presence of a hybrid ISLP/PCM to trigger a transition to a clear channel mode of operation and an encrypted communication session before a destination MS served by the destination access network controller has requested an encrypted communication session. Thus a destination access network controller may automatically convert to a clear channel mode of operation even in the absence of instructions from a destination MS and may further request the destination MS to switch to an encrypted mode of operation.

In another embodiment of the present invention, communication system 100 may implement hard handoff of an encrypted communication session by executing known handoff techniques, such as IOS A1 Hard Handoff, whereby a target access network is requested to allocate radio resources and appropriate bearer service processing, that is, ICTP/ISLP. The target access network is informed that a clear channel is to be initiated, that is, that ICTP/ISLP bearer service is to be invoked, by passing the appropriate Service Option value from the source access network to the target access network. Because the access networks themselves do not operate directly on the encrypted payload for the ICTP service option, the target access network may create silence or a known tone for conveyance to an MS serviced by the target access network until ICTP synchronization is re-achieved. The users of the MSs participating in the communication session may also be notified by out-of-band messaging to the MSs of the unsynchronized state of the session. Further, the processing state of an ICTP layer can be transferred from the source to the target access network in order to more seamlessly resume processing at the appropriate point.

Communication system 100 may further provide jitter protection against timing jitter on the clear channel (ICTP/ISLP) link that may result from differential delay in soft handoff (SHO) add/drops. The ICTP layer of an access network controller 110, 130 may implement jitter protection that minimizes delay and speech impact by storing every frame received by the access network controller off of the ISLP bearer path in the jitter buffer 206 of the access network controller, regardless of the 20 ms transcoder timing. In the case that multiple ICTP frames arrive within 20 ms, ICTP will use sequence numbering and frame rates to determine which frames to give priority to transmitting, and which to drop to minimize delay.

In yet another embodiment of the present invention, communication system 100 may permit toggling between a clear channel mode of operation, that is, ICTP/ISLP transcoding, and a non-clear channel mode of operation, for example, EVRC vocoding, by executing IS-2000 service negotiation techniques that are modified by communication system 100 for negotiating between a clear channel mode of operation and a non-clear channel mode of operation. When an MS, such as MS 102, desires to switchover to a clear channel mode of operation, the MS sends an access network serving the MS, that is, access network 106, an IS-2000 SERVICE REQUEST message requesting a Service Option that requires ICTP/ISLP. In response to receiving such a SERVICE REQUEST message, access network 106, and in particular access network controller 110, toggles to an ICTP/ISLP mode of operation. When MS 102 desires to switchover to a non-clear channel mode of operation, the MS sends access network 106 an IS-2000 SERVICE REQUEST message requesting a voice service requiring a vocoder, such as EVRC, which results in toggling the access network, and in particular access network controller 110, back to EVRC. Access network 106, that is, access network controller 110, may switchover at the request of the MS or may switchover if the access network detects a condition which will not support ICTP/ISLP mode, for example, a three party conference call, Dual Tone Multi-Frequency (DTMF) tones, or bad span-line conditions. Upon switching over, access network 106 may inform the MS serviced by the access network of the switchover, and thereby notify the user of the MS via tone or messaging so the users are aware of the encryption state.

In still another embodiment of the present invention, communication system 100 may block implementation of features, such as DTMF tones, echo cancellation, vocoder bypass, multi-party conference, call waiting tones, and TTY/TDD, etc., that are not supported by ICTP and that can corrupt an ISLP stream when an access network is operating in a clear channel mode, that is, an ICTP/ISLP mode.

In yet another embodiment of the present invention, an ICTP layer further may be implemented as an Interworking Function (IWF) 118 collocated at MSC 116. IWF 118 provides MSC 116 with the ICTP/ISLP functionality that is described above with respect to controllers 110 and 130. After ICTP synchronization between IWF 118 and an access network controller 110, 130, ICTP/ISLP payload received at MSC 116 may be modulated by IWF 118 onto a modem connection, which a landline modem/decoder located at landline end terminal 152 can demodulate, extracting the encrypted payload and then decrypting it as speech. In the other direction, the demodulated frames from landline end terminal 152 can be packaged into ISLP frames with ICTP headers by IWF 118 to produce ICTP frames and then transmitted over ISLP to any of the multiple wireless access networks 106, 126. In response to receiving the ICTP/ISLP frames from IWF 118, the wireless access network 106, 126 may reframe the payload pursuant an air interface protocol and convey the payload to a respective MS 102, 122 serviced by the wireless access network.

In summarization, a communication system 100 provides a clear channel link across an associated network 140 for a conveyance of encrypted payload. The encrypted payload is included in an ISLP frame without decrypting the payload and then the ISLP frame may be wrapped with a link layer header that identifies one or more of frame type information and a sequence value associated with the frame or, instead of or in addition to the header, a particular number of bits of the ISLP frame may be encoded to indicate the frame's coding rate and rate set. The ISLP frame, with the added header and/or encoded bits, is then conveyed across the network. Thus communication system 100 provides for a transport of the encrypted payload across the network without the need to decrypt the payload. Further, communication system 100 provides for clear channel synchronization based on the added header and/or a bit count associated with the ISLP frame, as initiation of operation in a clear channel mode by a source access network and a destination access network may occur independently of each other. Due to the possibility of a synchronization issue, communication system 100 further provides for a muting of a forward audio link, or a generation of a hybrid ISLP/PCM stream, in order to minimize the harsh noise that otherwise may be conveyed by an access network to a served MS prior to detection of forward link clear channel synchronization. Communication system 100 further provides for handoff of a clear channel communication session, a toggling between a clear channel mode of operation and a non-clear channel mode of operation, jitter protection against timing jitter on a clear channel link, and a blocking of features that can corrupt an ISLP stream when an access network is operating in a clear channel mode.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for transport of encrypted payload across a network of a wireless communication system comprising:
   receiving a request to convert a communication session to an encrypted communication session, wherein the request comprises a Service Request message comprising a Service Option (SO) value in an SO data field corresponding to a clear channel mode of operation;
   determining whether an encrypted communication session is supported;
   in response to determining that an encrypted communication session is supported, granting the request to convert the communication session to an encrypted communication session, wherein granting the request comprises conveying a Service Connect message comprising a service configuration record in an SO data field informing that the request has been granted;
   receiving a frame via an air interface, wherein the frame is formatted pursuant to an air interface protocol and comprises encrypted payload;
   demultiplexing the frame to separate the encrypted payload;
   assembling an Intersystem Link Protocol (ISLP) frame that comprises the encrypted payload;
   adding a link layer header to the ISLP frame that identifies one or more of frame type information and a sequence value associated with the frame; and
   conveying the ISLP frame and added header to a network element.

2. The method of claim 1, wherein the frame type information comprises one or more of a frame rate, a rate set, or an indication of an erased frame, a corrupt frame, or no frame received.

3. The method of claim 1, wherein assembling an Intersystem Link Protocol (ISLP) frame comprises:
   determining whether the frame received via the air interface was correctly received;
   when the frame is correctly received via the air interface, including the encrypted payload in the ISLP frame; and
   when the frame is not correctly received via the air interface, including a traffic channel null payload in the ISLP frame.

4. The method of claim 3, wherein determining whether the frame received via the air interface was correctly received comprise determining whether the frame is an erasure, a corrupt frame, or no frame was received.

5. The method of claim 1, wherein when the frame is not correctly received via the air interface, adding a link layer header comprises adding a traffic channel null header to the ISLP frame.

6. The method of claim 1, further comprising performing encryption synchronization with the network element.

7. The method of claim 1, further comprising, in response to determining that an encrypted communication session is supported, switching to an encryption mode of operation.

8. The method of claim 1, wherein the request to convert a communication session to an encrypted communication session comprises one or more of a short message service message and a predetermined sequence of Dual Tone Multi-Frequency (DTMF) tones corresponding to a clear channel mode of operation.

9. A method for transport of encrypted payload across a network of a wireless communication system comprising:
   receiving a frame via an air interface, wherein the frame is formatted pursuant to an air interface protocol and comprises encrypted payload;
   demultiplexing the frame to separate the encrypted payload;
   assembling an Intersystem Link Protocol (ISLP) frame that comprises the encrypted payload;
   adding a link layer header to the ISLP frame that identifies one or more of frame type information and a sequence value associated with the frame;
   conveying the ISLP frame and added header to a network element
   receiving, by the network element, the Intersystem Link Protocol (ISLP) frame with the added link layer header;
   stripping, by the network element, the link layer header off of the frame;
   assembling a frame in an over-the-air format, which frame includes the encrypted payload; and transmitting the over-the-air formatted frame over an air interface.

10. The method of claim 1, wherein assembling an Intersystem Link Protocol (ISLP) frame that comprises the encrypted payload comprises:
determining whether a network element is operating in an encryption mode;
when a determination is made that the network element is operating in an encryption mode, assembling an Intersystem Link Protocol (ISLP) frame that comprises the encrypted payload; and
when the network element is not yet determined to be operating in an encryption mode, conveying a Pulse Code Modulation (PCM) stream to the network element that is designed to not produce audio artifacts when decoded by a PCM Mu-law or A-law decoder.

11. The method of claim 10, wherein the Pulse Code Modulation (PCM) stream comprises start and end Intersystem Link Protocol flags that are selected to not produce audio artifacts when decoded by Mu-law or A-law decoders and wherein between the flags are PCM samples for soft Gaussian noise.

12. A method for synchronizing access network controllers in a wireless communication system comprising:
monitoring, by an access network controller, a stream of frames received from another access network controller for ISLP frames;
determining, by the access network controller, whether a 'ISLP_Sync_Lost_Count' value and a 'ISLP_Sync_Acquired_Count' value have changed;
determining, by the access network controller, whether an invalid ISLP frame has arrived;
determining, by the access network controller, a number of valid ISLP frames that have arrived;
determining, by the access network controller, whether the another access network controller is synchronized based on one or more of the 'Sync_Lost_Count' value, the 'Sync_Acquired_Count' value, whether an invalid ISLP frame has arrived, and a number of valid frames that have arrived; and
transmitting traffic channel null frames to a served mobile station prior to determining that the another access network controller is synchronized.

13. The method of claim 12, wherein a valid ISLP frame comprises a full, half, quarter, or eighth rate frame, wherein the ISLP frame includes a header identifying a coding rate and rate set of the frame, and wherein determining whether an invalid ISLP frame has arrived comprises analyzing the header of the frame to confirm the frame's coding rate.

14. The method of claim 12, wherein a valid ISLP frame comprises a full, half, quarter, or eighth rate frame that is identified by a bit count of the frame.

15. The method of claim 12, further comprising:
assembling, by the another access network controller, an Intersystem Link Protocol (ISLP) frame that comprises an encrypted payload and a link layer header that identifies one or more of a coding rate of the frame, a sequence value associated with the frame, and whether the frame received via the air interface was correctly received; and
conveying the assembled ISLP frame to produce the monitored stream of frames.

16. The method of claim 12, further comprising:
when not operating in clear channel mode, detecting Intersystem Link Protocol synchronization in a received stream of bits from the another access network controller, which access network controller is operating in clear channel mode; and
initiating a switch of itself into clear channel mode.

17. A controller for operation in a wireless access network, the controller comprising a processor that is configured to receive a request to convert a communication session to an encrypted communication session, wherein the request comprises a Service Request message comprising a Service Option (SO) value in an SO data field corresponding to a clear channel mode of operation, determine whether an encrypted communication session is supported, in response to determining that an encrypted communication session is supported, grant the request to convert the communication session to an encrypted communication session, wherein granting the request comprises conveying a Service Connect message comprising a service configuration record in an SO data field informing that the request has been granted, receive a frame via an air interface, wherein the frame is formatted pursuant to an air interface protocol and comprises encrypted payload, demultiplex the frame to separate the encrypted payload, assemble an Intersystem Link Protocol (ISLP) frame that comprises the encrypted payload, add a link layer header to the ISLP frame that identifies one or more of a coding rate of the frame, a sequence value associated with the frame, and whether the frame received via the air interface was correctly received, and convey the ISLP frame and added header to a network element.

* * * * *